(12) United States Patent
Mirza et al.

(10) Patent No.: US 9,130,798 B1
(45) Date of Patent: Sep. 8, 2015

(54) MANAGING INTERNET PROTOCOL ADDRESS ALLOCATION

(75) Inventors: Nasir Mahmood Mirza, Overland Park, KS (US); Hassan Raza, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 917 days.

(21) Appl. No.: 13/241,357

(22) Filed: Sep. 23, 2011

(51) Int. Cl.
*G06F 13/00* (2006.01)
*H04L 29/06* (2006.01)

(52) U.S. Cl.
CPC .................................. *H04L 29/06* (2013.01)

(58) Field of Classification Search
CPC ...................... H04L 29/08981; H04L 41/0806; H04L 41/12; H04L 29/08072; H04L 29/06; H04L 41/0213; H04L 41/22
USPC .................................................. 709/220, 223
See application file for complete search history.

(56) References Cited

U.S. PATENT DOCUMENTS

2011/0047256 A1* 2/2011 Babu et al. .................... 709/223

* cited by examiner

*Primary Examiner* — Robert B Harrell

(57) ABSTRACT

The invention is directed to methods and systems for managing internet protocol (IP) addresses. In particular, the invention provides an approach to reuse IP address among multiple devices by combining the IP address and a unique code. By including a unique code, each mobile device using the same IP address is still easily identified. Further, the invention allows for reusing IP addresses within a single telecommunications sector such that devices in the same area may use the same IP address.

22 Claims, 5 Drawing Sheets

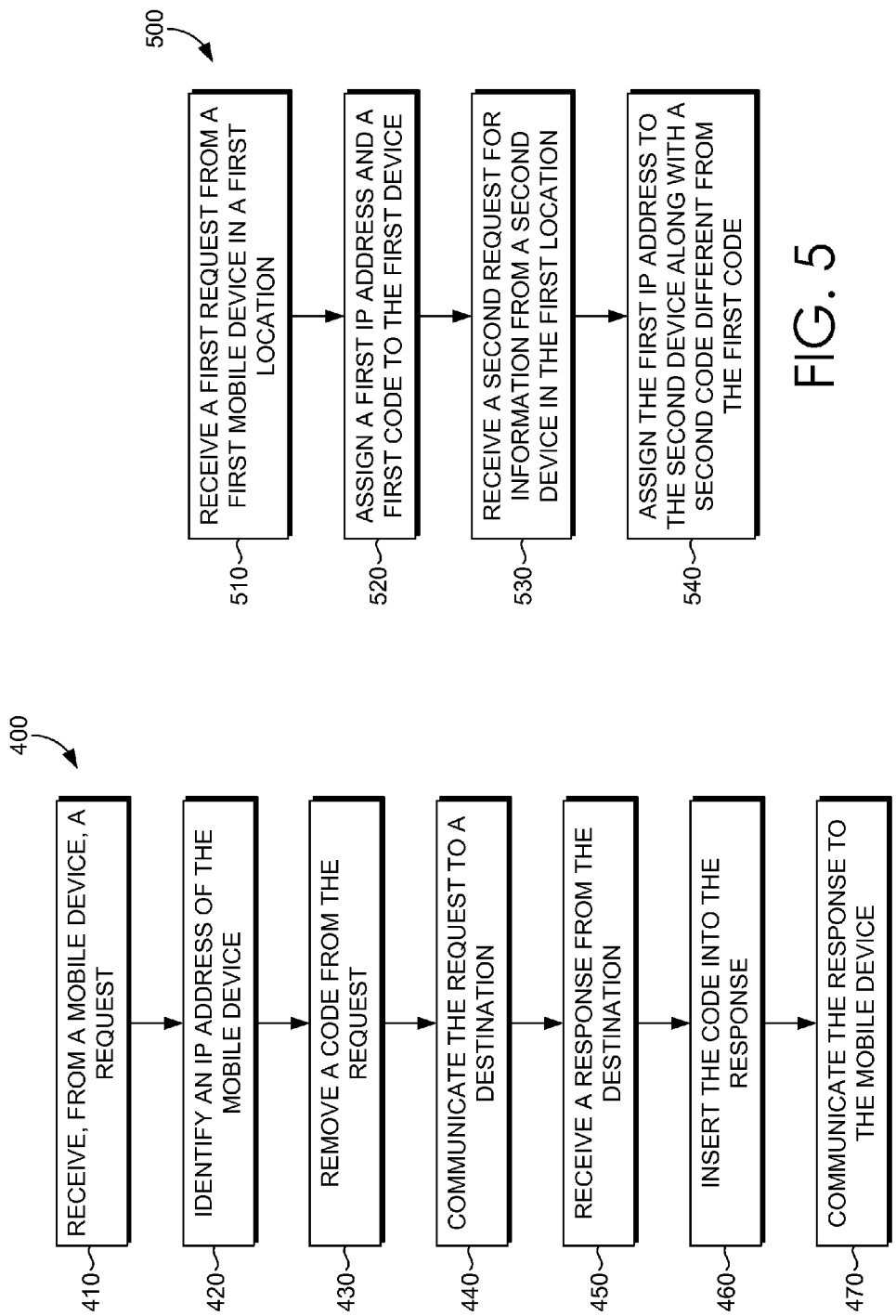

MANAGING INTERNET PROTOCOL ADDRESS ALLOCATION

SUMMARY

A high-level overview of various aspects of the invention are provided here for that reason, to provide an overview of the disclosure and to introduce a selection of concepts that are further described below in the detailed-description section below. This summary is not intended to identify key features or essential features of the claimed subject matter, nor is it intended to be used as an aid in isolation to determine the scope of the claimed subject matter.

In brief and at a high level, this disclosure describes, among other things, managing internet protocol (IP) address allocation. In embodiments, management of IP addresses is accomplished by utilizing a unique code to expand the use of IP addresses in an Internet Protocol version Four (IPv4) network. For instance, IP addresses in an IPv4 network may be reused and paired with a unique spreading code to alleviate IP address space issues. In an example, a first mobile device with a first IP address may be associated with a unique spreading code while a second mobile device, having the same IP address, may be associated with a different unique spreading code such that the two devices may be differentiated and may both access the network.

BRIEF DESCRIPTION OF THE SEVERAL VIEWS OF THE DRAWINGS

Illustrative embodiments of the present invention are described in detail below with reference to the attached drawing figures, and wherein:

FIG. 4 depicts an illustrative flow diagram that depicts a method for managing IP addresses, in accordance with an embodiment of the present invention;

FIG. 5 depicts an illustrative flow diagram that depicts a method for managing IP addresses, in accordance with an embodiment of the present invention.

DETAILED DESCRIPTION

Figure 1:
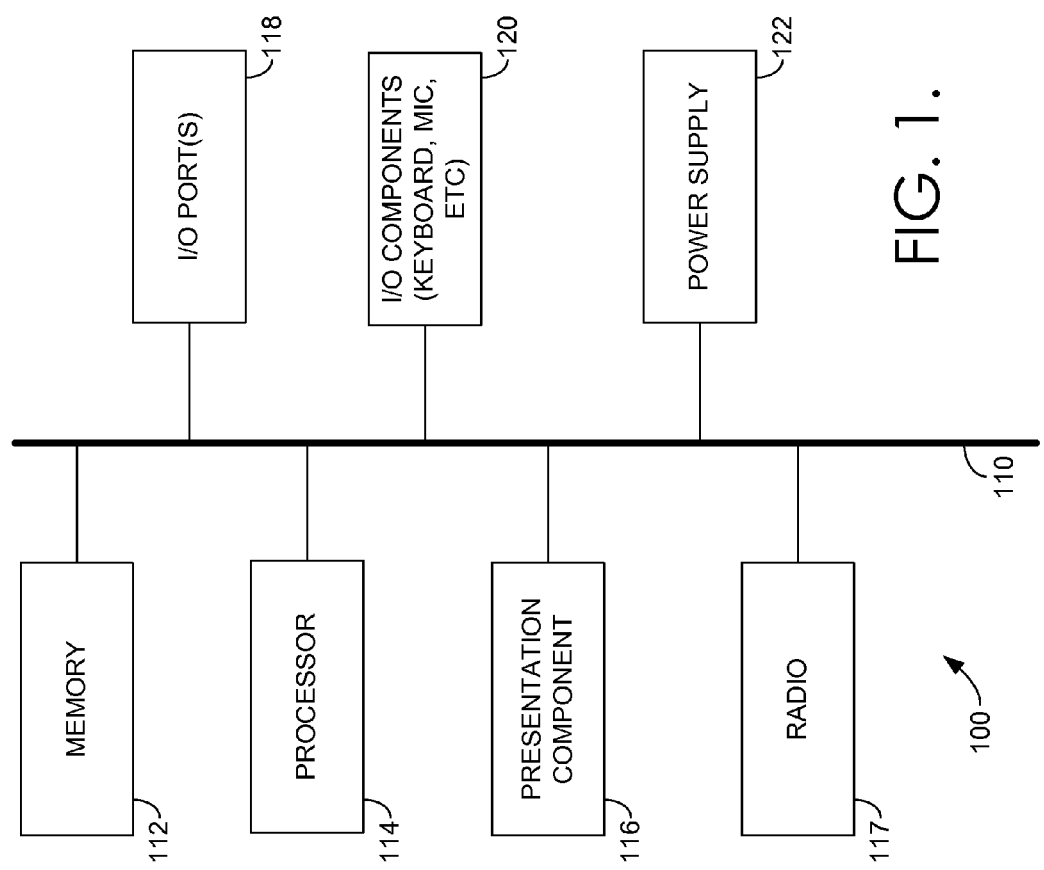
FIG. 1 depicts a block diagram of a mobile device in accordance with an embodiment of the present invention.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| BTS | Base Transceiver Station |
| CDMA | Code Division Multiple Access |
| GPRS | General Packet Radio Service |
| GSM | Global System for Mobile communications (Groupe Spécial Mobile) |
| HA | Home Agent |
| HTTP | Hypertext Transfer Protocol |
| IP | Internet Protocol |
| IPv4 | Internet Protocol Version Four |
| IPv6 | Internet Protocol Version Six |
| PDA | Personal Data Assistant |
| PDSN | Packet Data Serving Node |
| PPP | Point-to-Point Protocol |
| RNC | Radio Network Controller |
| TDMA | Time Division Multiple Access |

Further, various technical terms are used throughout this description. An illustrative resource that fleshes out various aspects of these terms can be found in Newton's Telecom Dictionary, 25th Edition (2009).

Embodiments of our technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

As mentioned, embodiments of the present invention are directed toward managing IP addresses. Specifically, embodiments of the present invention are directed toward managing IP address allocation in an IPv4 network. With the fast paced growth of wireless technology and an increase in the number of wireless subscribers, the IPv4 network has nearly exhausted its resources; namely, the IPv4 network is running out of IP addresses. An alternative to the IPv4 space issue is to move forward with the IPv6 network. Rather than a thirty-two (32) bit address, as in the IPv4 network, the IPv6 network would utilize a 128 bit IP address and, thus, would greatly expand the number of available IP addresses. However, with the advance of the IPv6 network, the entire network structure that is utilized today in the IPv4 network would need to be updated. Additionally, a 128 bit IP address is not as easy to work with as a 32 bit address as it cannot easily be remembered, there is an increased likelihood of typos and errors, and the like.

Embodiments of the present invention provide management of the allocation of IP addresses in the existing IPv4 network as an alternative to a transition to the IPv6 network. Embodiments of the present invention provide a system within the IPv4 network that allows for reuse of IP addresses when used in combination with a unique code. For example, the code may be a CDMA spreading code. Additional embodiments also reuse IP addresses within the same location. For instance, as mobile device users are often times mobile, a user may relocate to a location where another user is associated with the same IP address. As long as the IP address and code combination is different for both of the users, there is no need to interrupt the network session as the same IP address can be reused. This will increase the number of subscribers that may access the network with a limited number of IP addresses.

In a first aspect, computer-readable media having computer-executable instructions embodied thereon that, when executed, enable a computing device to perform a method of managing IP addresses is provided. A mobile device may communicate with a wireless telecommunications network. The mobile device may initiate communicate by sending a request to access information of a destination. The mobile device may or may not be associated with an IP address at this point. If the mobile device is associated with an IP address, the IP address is identified. A code that has been associated with the IP address is removed from the request and the request is communicated to a destination. The code is unique to the IP address so that any other mobile device associated with the IP address is associated with a second code unique to the IP address and different from the code. A response is then received from the destination and the code, which was previously removed, is inserted into the response. The code is inserted into the response based on identifying the IP address associated with the response and associating the IP address with the code. The response is then communicated to the mobile device. The code is removed and inserted such that it is not communicated to or from the destination.

In a second aspect, computer-readable media having computer-executable instructions embodied thereon that, when executed, enable a computing device to perform a method of managing IP addresses is provided. A first request from a first mobile device in a first location is received and an IP address and unique code combination are assigned to the first mobile device. A second request is then received from a second mobile device in the first location. The first IP address is also assigned to the second mobile device and a second code, different from the first code, is assigned to the second mobile device. This enables both the first and second mobile devices to be in the same location and use the same IP address.

In a third aspect, computer-readable media having computer-executable instructions embodied thereon that, when executed, enable a computing device to perform a method of managing IP addresses is provided. A first request is received from a first mobile device and an IP address of the first mobile device is identified. A unique code of the first mobile device may also be identified. A first port number and a first session identifier associated with the first request are also identified. A first code associated with the IP address is removed from the first request. The first code may be a CDMA code. The first request is then communicated to a first destination. A second request from a second mobile device is received and an IP address, a second port number, and a second session identifier associated with the second request are identified. A second code is removed from the second request and the second request is communicated to a second destination. The second destination may or may not be the same as the first destination. A first response is received from the first destination and the first response includes the first port number and the first session identifier. The first port number and the first session identifier are associated with the first mobile device and the first code. Upon associating the first port number and the first session identifier with the first code, the first code is inserted into the first response the first response is communicated to the first mobile device.

Turning now to FIG. 1, a block diagram of an illustrative mobile device is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like (including what is known in the art as Wimax® technology and also Long Term Evolution (LTE)). In some embodiments, radio 117 might also facilitate other types of wireless communications including Wi-Fi®, Bluetooth® communications, GIS communications, and other near-field communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
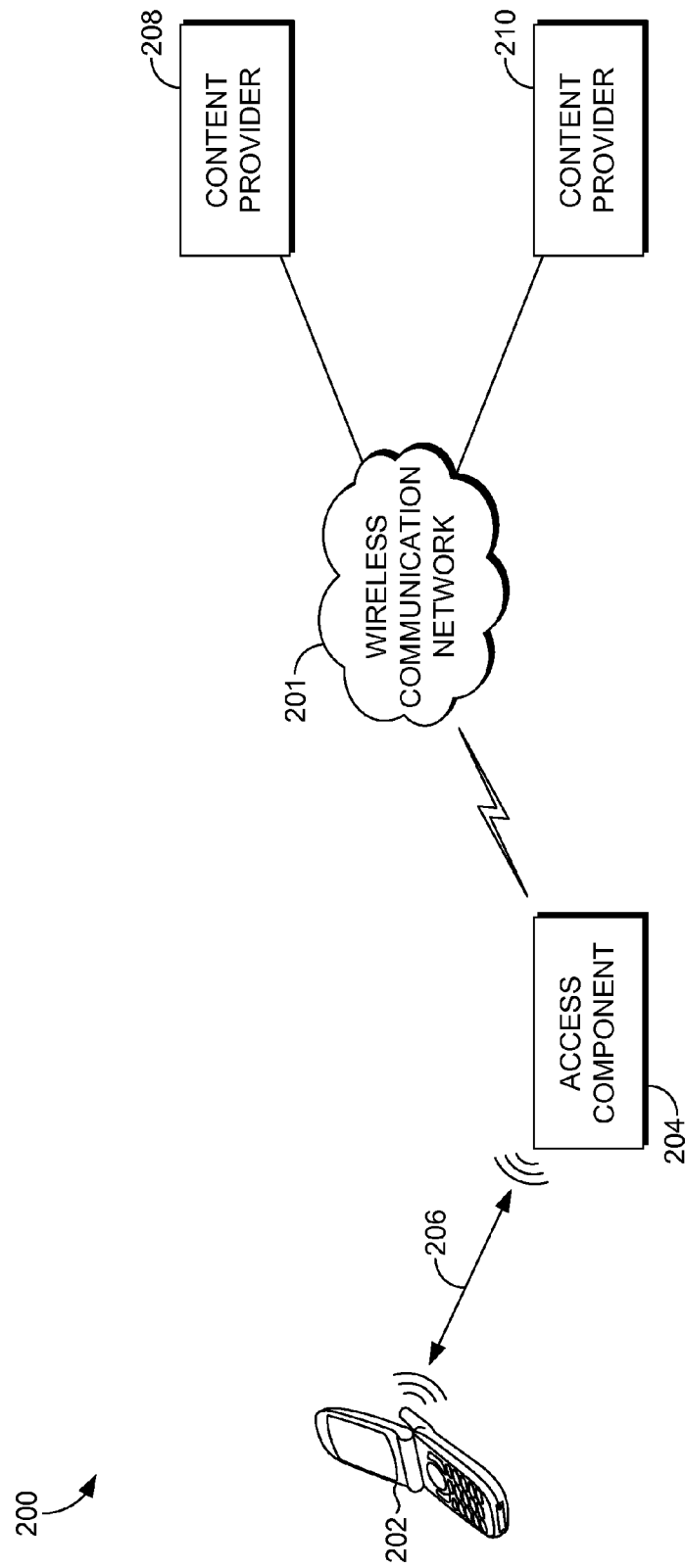
FIG. 2 depicts a system diagram of an exemplary system for carrying out embodiments of the present invention.

FIG. 2 depicts a block diagram of an exemplary system suitable for managing IP address allocation and is referenced generally by the numeral 200. It will be understood that the exemplary system 200 shown in FIG. 2 is merely an example of one suitable computing system environment for use with embodiments of the present invention. Neither should the exemplary system 200 be interpreted as having any dependency or requirement related to any single module/component or combination of modules/components illustrated therein. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The exemplary system 200 includes a network 201, a mobile device 202, an access component 204, and content providers 208 and 210. As mentioned, other components not shown here may also be used to carry out aspects of the present invention. Further, several components shown in FIG. 2 may be combined into a single component although shown separately in FIG. 2. The components illustrated in FIG. 2 may communicate with one another by way of the network 201. Network 201 may include, without limitation, one or more LANs and/or wide area networks WANs. Such networking environments are commonplace in offices, enterprise-wide computer networks, intranets, and the Internet. Accordingly, network 201 is not further described herein. Mobile device 202 may be the device 110 of FIG. 1, and, as such, will not be further described herein.

Mobile device 202 communicates with access component 204 by way of a communications link 206. Communications link 206 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (e.g., a primary connection and a secondary connection). A short-range connection may include a Wi-Fi® connection to a device (e.g., mobile hotspot) that provides access to a wireless communications network, such as a WLAN connection using 802.11 protocol. A long-range connection may include a connection using one or more of CDMA, GPRS, GSM, TDMA, and 802.16.

Generally, the access component 204 provides access to what some skilled artisans refer to as a wireless communications network, also termed a core network and illustrated as network 201. The network 201 may comprise one or more of the components illustrated in FIG. 2. To the contrary, not all components that make up a wireless communications network are shown. Also, not all connections or possible connections are shown. The access component 204 may be one or more of a base transceiver station (BTS) tower, a Wi-Fi® Router, a Mobile Hotspot, and any other device that facilitates communication between mobile device 202 and network 201.

As mentioned, some components are not depicted in FIG. 2 so as to not obscure aspects of the various embodiments of the present invention. For instance, network 201 may include various components that are not shown. One of these components may be a network-access gateway (not shown) that helps facilitate communication between mobile device 202 and other networks (not shown) as well as the Internet (not shown).

Generally, in this disclosure, when we speak of communicating data or information we are referring to any action that requires mobile device 202 to have an IP address in order to carry out some action. Such actions may include accessing e-mail or video mail, video conferencing, accessing the Internet, and the like.

Content providers 208 and 210 represent various applications, services, etc., that are available via network 201. For instance, gaming applications, weather applications, messaging services, and social media outlets are just a few of the many types of content providers contemplated to be within the scope of the present invention.

In application, access component 204 may be configured to manage the allocation of IP addresses. Access component 204 may include, or be connected to, a managing component (not shown) configured to manage the allocation of IP addresses for access component 204. Presently, a mobile device, such as mobile device 202, begins to communicate with access component 204 to gain access to, for example, network 201. In order to gain access to network 201, mobile device 202 requires an IP address. An IP address may be identified for the mobile device and CDMA technology may be used to encode any transmissions to/from the mobile device. However, the code is applied to the transmission and then communicated along with the transmission to/from a destination source such as content provider 208 and 210. The code is also not combined in any way with the IP address.

As an example, assume that a transmission is received from a mobile device and the transmission includes the following transmission bits: 1, −1, 1, and 1. CDMA technology may be used to encode the transmission and the unique CDMA code may be, for example, 1, 1, −1, and −1. When the code 1, 1, −1, and −1 is applied to the transmission, the resulting encoded transmission is 1, −1, −1, and −1. This is what is communicated over a network. Once a response is received, the original code of 1, 1, −1, and −1 is applied to decode the transmission. Thus, the original code of 1, 1, −1, and −1 is applied to the transmission of 1, −1, −1, and −1. This results in the decoded response of 1, −1, 1, and 1. Notice that the decoded response is the same transmission bits as what was originally transmitted from the mobile device. Thus, the CDMA technology allows for secure transmission of information but the code is not combined with an IP address and the code is communicated with the transmission.

Access component 204 may be configured to combine CDMA code technology with an IP address of a mobile device. By combining the CDMA code and the IP address, it is possible to reuse an IP address for multiple mobile devices as long as the CDMA code is different for each IP address that is the same. For example, it is possible for two mobile devices associated with the same IP address to communicate with the same access component and still be uniquely identified based on a unique code.

This concept may be initialized whenever a mobile device attempts to communicate with an access component. In the instance of FIG. 2, mobile device 202 may attempt to communicate with access component 204 via communications link 206. An IP address of mobile device 202 is identified. The IP address may already be associated with mobile device 202 if a network session is already in place or the IP address may be associated with mobile device 202 by access component 204 upon receiving an indication that mobile device 202 desires to communicate with access component 204.

Along with the IP address being identified, a port number and a session identifier may also be identified. Each network session is assigned a session identifier which may or may not be unique to the network session. Each network session is also assigned a port number. The port number is unique to each individual network session. The information identified (e.g., port number, IP address, session identifier, and the like) may be stored by access component 204 in a routing table, for example. A routing table, as used herein, refers generally to any structure (e.g., table, chart, text document) that may be used to store information identified by an access component or any other component of system 200.

Access component 204 also identifies code that is associated with the IP address of mobile device 206. The code may be CDMA technology, as previously discussed. Once the code is identified, it may be stored in the routing table along with the other identifying information of the transmission. Access component 204 may then remove the code from the transmission such that the code does not travel via network 201. Meanwhile, even though the code has been removed, the transmission is still associated with the IP address and one or more of the port number and the session identifier.

Once the code is removed, the transmission may be communicated via network 201 to one or more destinations such as content providers 208 and 210. For the sake of simplicity, assume that the transmission in this case is communicated to content provider 208. Content provider 208 may receive the transmission in the usual fashion and may respond to the transmission by communicating a response, via network 201, to access component 204. The response may include, by way of example only, the IP address, the port number, the session identifier, content responding to a request in the transmission, and the like. As the code was removed from the transmission before it was communicated to content provider 208, the response from content provider 208 will not include the code.

Once the response is received at access component 204, it must be determined to which mobile device the response is associated. As previously mentioned, IP addresses may be reused in the present invention such that two devices within a same location (e.g., the same wireless telecommunications sector) may use the same IP address. Given that two devices may be using the same IP address, the IP address alone may not be enough to identify a device to which the response belongs. Access component 204 may reference the routing table to identify additional information. For example, the response may include the port number and/or session identifier. In this case, access component 204 may locate the port number and/or session identifier of the response within the routing table and identify both the code and the mobile device associated with the response.

Once the appropriate mobile device is identified, the associated code may be inserted into the response such that the response is communicated from access component 204 to, for example, mobile device 202.

As illustrated in the description above, by using unique codes in combination with IP addresses it is possible to reuse IP addresses among mobile devices in a single cell sector (e.g., a wireless telecommunications cell sector). The above-described embodiments may be applied to, by way of example only, CDMA, LTE, and the like.

Figure 3:
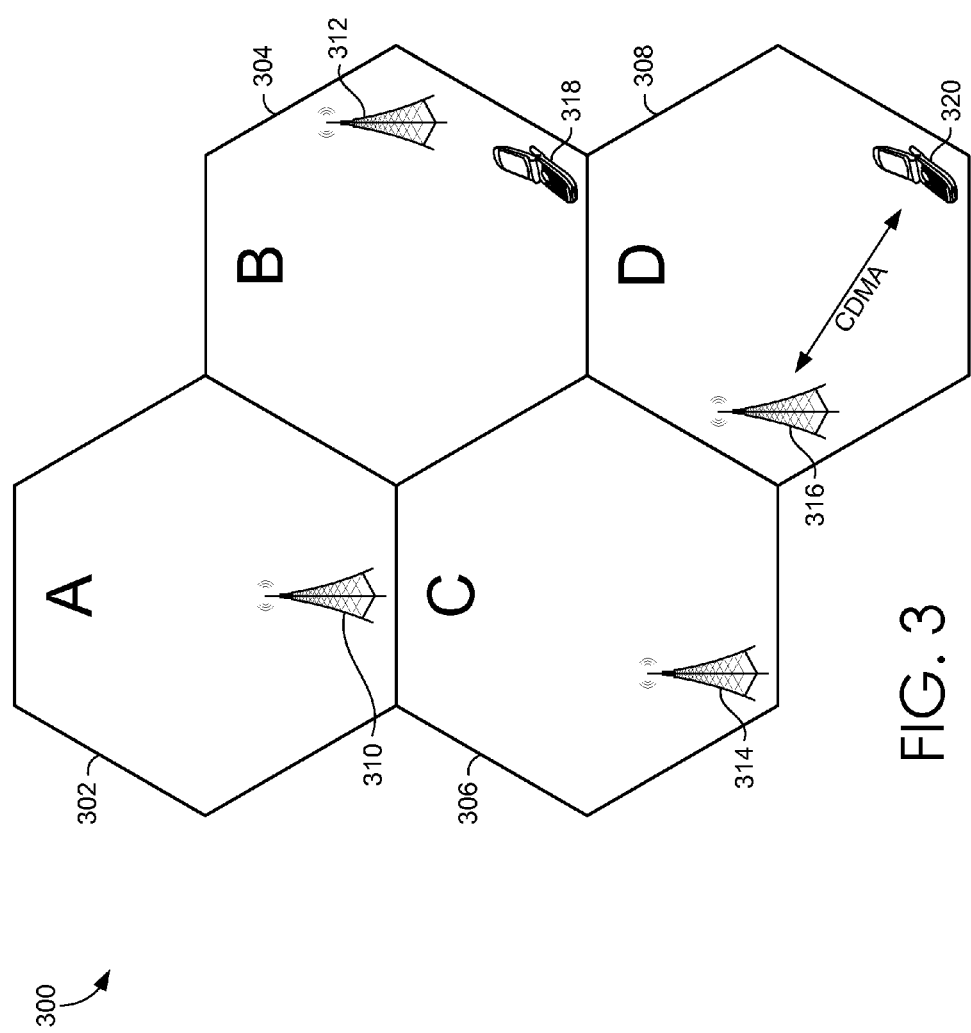
FIG. 3 depicts a diagram of an exemplary system for carrying out embodiments of the present invention.

Turning now to FIG. 3, an exemplary embodiment of the present invention is illustrated, and referenced generally as the numeral 300. System 300 includes four cell sectors identified as cell sectors 302, 304, 306, and 308. The cell sectors may be, for example, different areas of a city such as North, South, East, and West areas. In an embodiment, cell sectors 302, 304, 306, and 308 are sectors of a wireless telecommunications provider. Each sector may include a wireless telecommunications tower as illustrated by towers 310, 312, 314, and 316. Various mobile devices may be present in system 300 and mobile devices 318 and 320 and illustrated in sectors 304 and 308, respectively.

Assume that mobile device 320 has previously communicated with tower 316 and is currently engaged in a telecommunications network session. As mobile device 320 is in the middle of a session, mobile device 320 has already been assigned an IP address. Also assume that mobile device 318 is also in the middle of a session and has been assigned an IP address as well. The two mobile devices may use the same IP address as they are in different sectors and communicating with different towers. For purposes of this example, the IP address assigned to mobile device 318 is the same as the IP address assigned to mobile device 320.

Embodiments of the present invention provide for both mobile device 318 and 320 to continue using the same IP address even if the two mobile devices end up in the same sector. For instance, assume that mobile device 320 is being used in a vehicle and moves from sector 308 to sector 304. Now, mobile device 320 and mobile device 318 are in the same sector (i.e., sector 304) and have the same IP address.

In one embodiment, mobile device 320's session may be terminated if both the IP address and the code associated with mobile device 320 are the same as the IP address and the code associated with mobile device 318. In other words, we already know that the IP addresses are the same for both so if the code is also the same, there is no way to distinguish between mobile device 318 and mobile device 320. The session of mobile device 320 may be terminated and a new session, with a new IP address and/or code may be initiated.

In additional embodiments, tower 312 determines whether the code for mobile device 320 is the same as the code for mobile device 318. As previously explained, if the code is the same the session may be terminated. Tower 312 may, in that case, initiate a new session with mobile device 320 using the same IP address and different code, a different IP address than any other mobile device in sector 304, or a same IP address as another mobile device within sector 304 but a different code.

If the code associated with mobile device 320 is not the same as the code associated with mobile device 318, the session may be maintained without interruption. Thus, two mobile devices having the same IP address may simultaneously communicate in a single sector.

Turning now to FIG. 4, referenced generally by the numeral 400, a flow diagram is depicted showing a method of managing IP addresses. Initially, at step 410, a request is received from a mobile device. The request may be a request to access a network, a request to access information from a content provider, and the like. At step 420, an IP address of the mobile device is identified. A code may also be identified that is associated with the mobile device and the IP address. At step 430, the code is removed from the request such that it is not communicated with the request. At step 440, the request is communicated to a destination. The destination may be a content provider. A response is received from the destination at step 450. At step 460 the code is inserted into the response. The code may be retrieved from a routing table based on, for example, an IP address of the response, a session identifier of the response, a port number of the response, and the like. At step 470, the response is communicated to the mobile device.

Turning now to FIG. 5, referenced generally by the numeral 500, a flow diagram is depicted showing a method of managing IP addresses. Initially, at step 510, a first request is received from a first mobile device in a first location. The request may be a request to access a network, a request to access information from a content provider, and the like. At step 520, a first IP address and a first code are assigned to the first mobile device. The first code may be a code from a CDMA environment.

At step 530, a second request is received from a second mobile device in the first location. The second request may be, as with the first request, a request to access a network, a request to access information from a content provider, and the like. At step 540, the first IP address is assigned to the second mobile device along with a second code that is different from the first code. As such, the first mobile device and the second mobile device are associated with the same IP address but different codes. The different codes make it possible to distinguish between the devices even though the IP addresses are the same.

Figure 6:
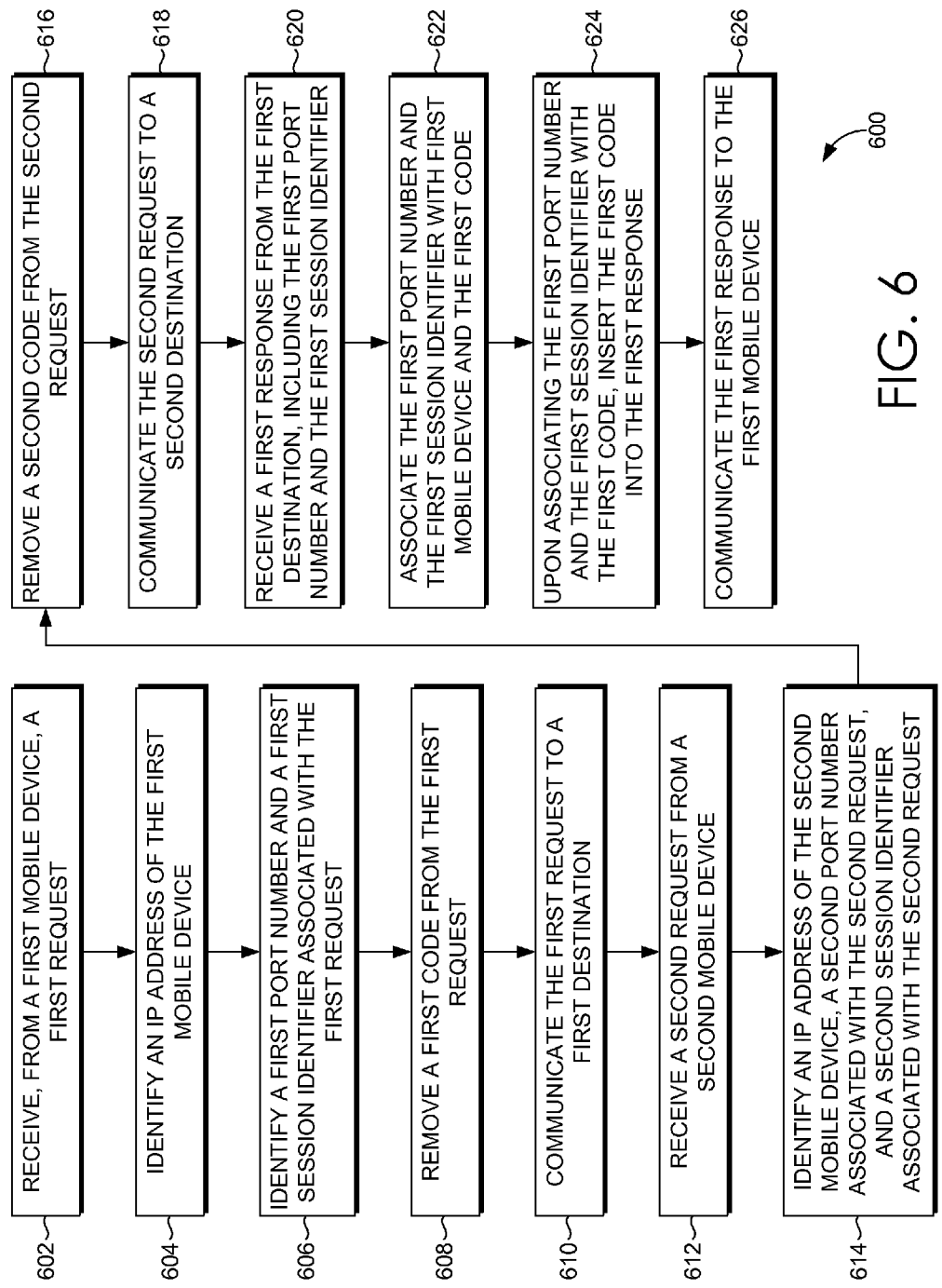
FIG. 6 depicts an illustrative flow diagram that depicts a method for managing IP addresses, in accordance with an embodiment of the present invention.

Turning now to FIG. 6, referenced generally by the numeral 600, a flow diagram is depicted showing a method of managing IP addresses. Initially, at step 602, a first request is received from a first mobile device. The first request may be a request to access a network, a request to access information from a content provider, and the like. At step 604, an IP address of the first mobile device is identified. A unique code associated with the IP address may also be identified. The code may be a code of a CDMA environment. Additionally, at step 606, a first port number and a first session identifier associated with the first request are identified. Each of the IP address, the code, the session identifiers, and the port numbers may be stored in a routing table for future reference.

At step 608 the code is removed from the first request. The first request is communicated to a first destination at block 610. The code is removed such that it is not communicated with the request.

At step 612, a second request from a second mobile device is received. The second request, as with the first request, may be a request to access a network, a request to access information from a content provider, and the like. At step 614, an IP address of the second mobile device is identified along with a second port number associated with the second request and a second session identifier associated with the second request. A code of the second mobile device may also be identified. A second code is removed from the second request at step 616 and the second request is communicated to a second destination at step 618. The second destination may be the same or different than the first destination.

A first response, including the first port number and the first session identifier, is received from the first destination at block 620. The first port number and the first session identifier are then associated with the first mobile device and the first code at block 622. The port numbers and session identifiers may be associated with mobile devices by use of a routing table, for example.

Upon associating the first port number and the first session identifier with the first code, the first code is inserted into the first response at step 624. The first response is then communicated to the first mobile device at step 626.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Computer-readable hardware media having computer-executable instructions embodied thereon that, when executed, enable a computing device to perform a method of managing internet protocol (IP) addresses, the method comprising:
   receiving, from a first mobile device, a transmission that includes a request to access information of a destination;
   decoding the transmission by applying a first spreading code to the transmission, wherein the first spreading code is unique to an IP address of the first mobile device such that a second mobile device associated with the IP address is associated with a second spreading code unique to the IP address and different from the first spreading code;
   identifying the IP address of the first mobile device;
   communicating the request to the destination such that the first spreading code is not included in the request;
   receiving a response from the destination; and
   encoding a second transmission that includes the response by applying the first spreading code to the second transmission, based on identifying the IP address associated with the response and associating the IP address with the first spreading code, wherein the response is communicated to the first mobile device via the second transmission.

2. The media of claim 1, wherein a port number is associated with both the request received from the first mobile device and the response received from the destination such that the port number is the same for both the request and the response.

3. The media of claim 2, wherein a session identifier is associated with both the request received from the first mobile device and the response received from the destination such that the session identifier is the same for both the request and the response.

4. The media of claim 3, further comprising identifying the first mobile device to receive the request using the port number, the session identifier, or both.

5. The media of claim 1, further comprising receiving a second request from a second mobile device having the same IP address as the first mobile device.

6. The media of claim 5, wherein the second request received from the second mobile device is associated with a different port number than the request received from the first mobile device.

7. The media of claim 1, wherein one or more of the first and second spreading codes are a code division multiple access spreading code.

8. The media of claim 1, wherein the destination is a content provider.

9. The media of claim 1, wherein one or more of the first and second spreading codes are not communicated to or from the destination.

10. Computer-readable hardware media having computer-executable instructions embodied thereon that, when executed, enable a computing device to perform a method of managing internet protocol (IP) addresses, the method comprising:
    receiving a first request from a first mobile device in a location;
    assigning a first IP address and a first spreading code to the first mobile device;
    storing the first IP address and the first spreading code in a routing table, wherein the first IP address and the first spreading code are associated with a first-mobile-device session of the first mobile device;
    receiving a second request from a second mobile device in the first location;
    assigning the first IP address to the second mobile device along with a second spreading code different from the first spreading code; and
    storing the first IP address and the second spreading code in the routing table, wherein the first IP address and the second spreading code are associated with a second-mobile-device session of the second mobile device.

11. The media of claim 10, further comprising identifying a third mobile device in a different location that is associated with the first IP address and a third spreading code, the third mobile device requesting access to the first location.

12. The media of claim 11, further comprising allowing the third mobile device to access a network of the first location without interrupting a session of the third mobile device.

13. The media of claim 12, wherein the network is an Internet Protocol version Four network.

14. The media of claim 10, wherein one or more of the first and second spreading codes are a code division multiple access spreading code.

15. The media of claim 10, further comprising assigning a port number and a session identifier to each of the first-mobile-device session and the second-mobile-device session such that the first-mobile-device session of the first mobile device is distinguishable from the second-mobile-device session of the second mobile device.

16. Computer-readable hardware media having computer-executable instructions embodied thereon that, when executed, enable a computing device to perform a method of managing internet protocol (IP) addresses, the method comprising:

receiving, from a first mobile device, a first transmission that includes a first request to access a network;

decoding the first transmission by applying a first spreading code to the first transmission, wherein the first spreading code is a code division multiple access spreading code;

identifying a first-mobile-device IP address of the first mobile device;

identifying a first port number and a first session identifier associated with the first request;

communicating the first request to a first destination;

receiving a second transmission that includes a second request from a second mobile device;

identifying a second-mobile-device IP address of the second mobile device, a second port number associated with the second request, and a second session identifier associated with the second request;

decoding the second transmission by applying a second spreading code to the second transmission;

communicating the second request to a second destination;

receiving a response from the first destination, including the first port number and the first session identifier;

associating the first port number and the first session identifier with the first mobile device and the first spreading code;

upon associating the first port number and the first session identifier with the first spreading code, utilizing the first spreading code to encode a third transmission that includes the response; and communicating the response to the first mobile device via the third transmission.

17. The media of claim 16, wherein the first spreading code does not travel to or from the first destination or the second destination.

18. The media of claim 16, wherein the network is an Internet Protocol version Four network.

19. The media of claim 16, wherein the second spreading code is a code division multiple access spreading code.

20. The media of claim 16, further comprising:

receiving a second response from the second destination including the second port number and the second session identifier;

associating the second port number and the second session identifier with the second mobile device and the second spreading code;

upon associating the second port number and the second session identifier with the second spreading code, utilizing the second spreading code to encode a fourth transmission that includes the second response; and communicating the second response to the second mobile device via the fourth transmission.

21. A method of managing internet protocol (IP) addresses, comprising:

receiving, from a mobile device, a first transmission that includes a request to access information of a destination;

decoding the first transmission by applying a first spreading code to the first transmission, wherein the first spreading code is unique to an IP address of the mobile device such that a different mobile device associated with the IP address is associated with a second spreading code unique to the IP address and different from the first spreading code;

identifying the IP address of the mobile device;

communicating the request to access information to the destination such that the first spreading code is not included in the request;

receiving a response from the destination; and encoding a second transmission that includes the response from the destination by applying the first spreading code to the second transmission, based on identifying the IP address associated with the response and associating the IP address with the first spreading code, wherein the response from the destination is communicated to the mobile device via the second transmission.

22. A network access component for managing internet protocol (IP) addresses, wherein the network access component includes one or more computing devices, and wherein the network access component is configured to:

receive a first request from a first mobile device in a first location;

assign a first IP address and a first spreading code to the first mobile device;

store the first IP address and the first spreading code in a routing table, wherein the first IP address and the first spreading code are associated with a first-mobile-device session of the first mobile device;

receive a second request from a second mobile device in the first location;

assign the first IP address to the second mobile device along with a second spreading code different from the first spreading code; and store the first IP address and the second spreading code in the routing table, wherein the first IP address and the second spreading code are associated with a second-mobile-device session of the second mobile device.

* * * * *